Feb. 23, 1954    R. H. BISHOP    2,669,850
REFRIGERATED OPEN TOP COMPARTMENT
Filed Nov. 14, 1951    2 Sheets-Sheet 1
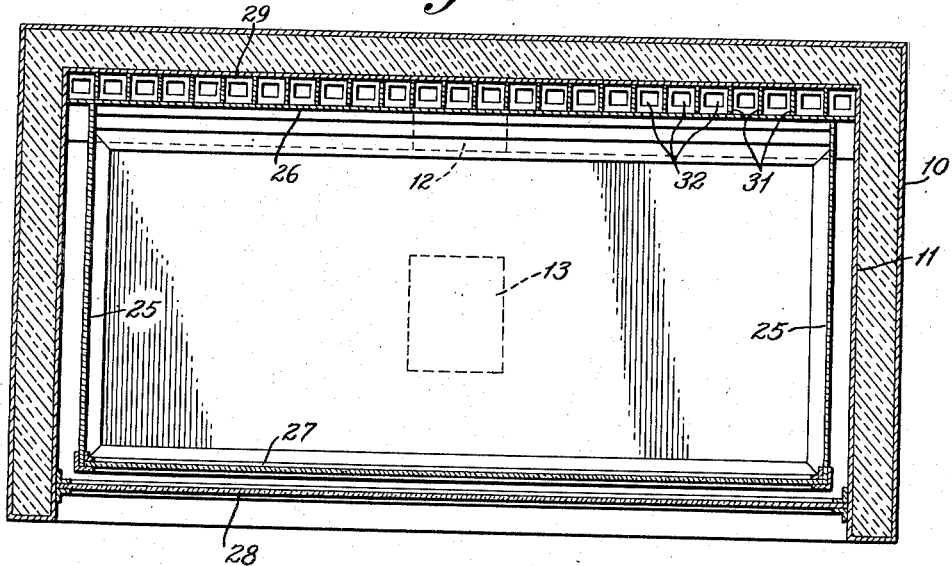
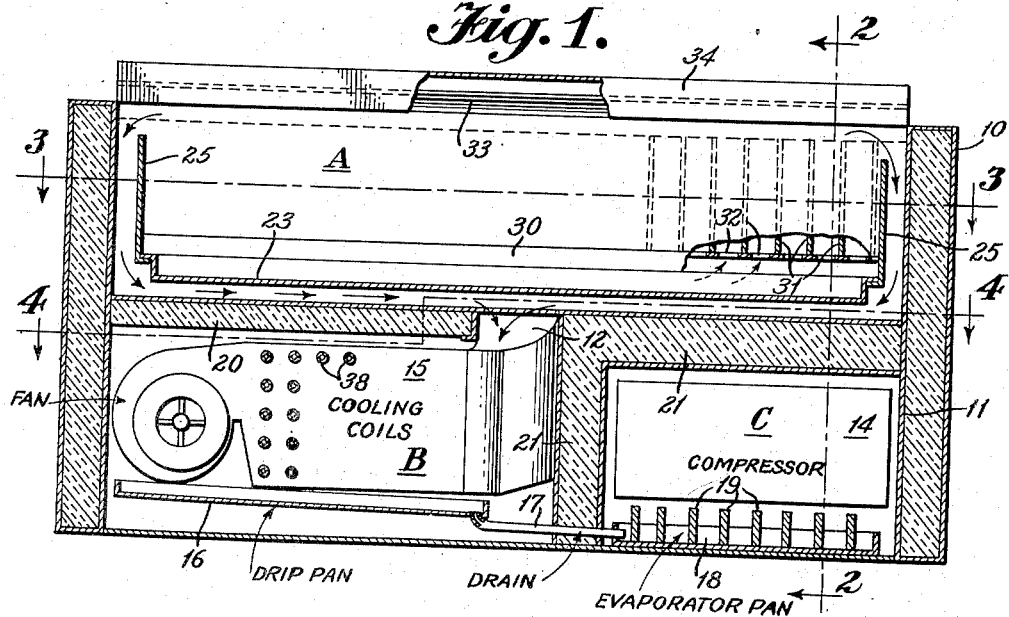
INVENTOR.
Robert H. Bishop
BY
Burns, Doane & Benedict
ATTORNEYS Feb. 23, 1954
R. H. BISHOP
2,669,850
REFRIGERATED OPEN TOP COMPARTMENT
Filed Nov. 14, 1951
2 Sheets-Sheet 2
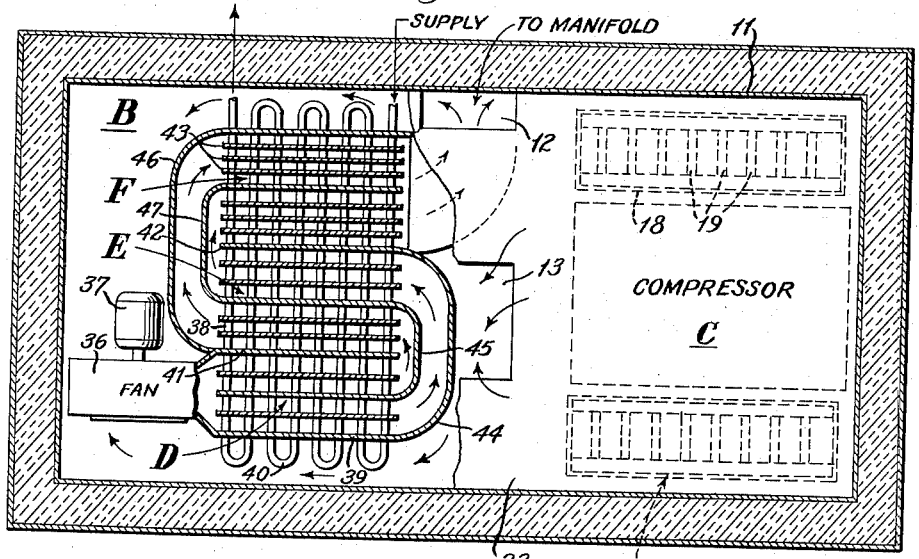
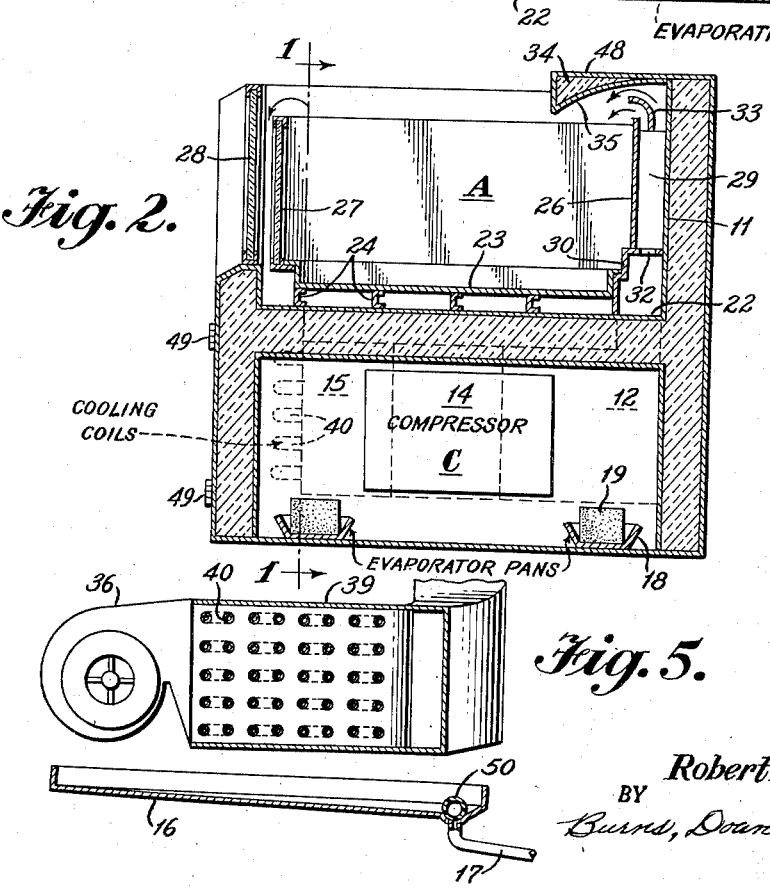
INVENTOR.
Robert H. Bishop
BY
Burns, Doane and Benedict
ATTORNEYS Patented Feb. 23, 1954

2,669,850

UNITED STATES PATENT OFFICE 2,669,850

REFRIGERATED OPEN TOP COMPARTMENT

Robert H. Bishop, Champaign, Ill.

Application November 14, 1951, Serial No. 256,203

3 Claims. (Cl. 62—89.5)

This invention relates to a commercial refrigeration system. More particularly it relates to an apparatus for dehumidifying and cooling a gaseous coolant, and an apparatus for distributing the coolant over materials to be refrigerated, and then recirculating it for further cooling and distribution. It especially relates to an improved frozen food display cabinet.

The adequate display of frozen foods is an important matter. Heretofore these have been arranged in refrigerated bins or boxes, open from above and generally divided into sections, the dividers containing cooling coils. Some have used circulating cold air for refrigeration. All have required defrosting at intervals of three to six hours with the result that foods in storage may become partially thawed and thus change in quality. Many of these require drainage lines for the water resulting from melting the frost.

The present invention provides a means whereby defrosting need be done but once in 24 hours, and eliminates the need for drainage. It provides an apparatus whereby coolant air is dehumidified and then cooled to refrigerating temperatures with high efficiency and without substantial change in cooling efficiency over long periods of time. It provides an apparatus in which the visual display of goods is increased with no decrease in cooling efficiency. It eliminates dividers in food compartments, as well as need for defrosting the food compartment itself. It provides uniform distribution of coolant air at all times without "overflow" from the open box.

Referring to the drawings:

Figure 1 is a front elevation in partial section, showing certain elements in diagrammatic form. This is taken along line 1—1 of Figure 2.

Figure 2 is an end elevation in partial section along the line 2—2, of Figure 1.

Figure 3 is a sectional plan view along the line 3—3 of Fgure 1.

Figure 4 is a plan view in partial section along the line 4—4 of Fgure 1, showing the arrangement of cooler coil elements, air circulation therethrough, and cooling fin arrangement.

Figure 5 is a front section of the cooling coil.

Referring to Figure 1, 10 represents a conventional insulated box which, for purposes of convenience, is partially shown in Figure 1, and more completely shown in Figure 3. The interior wall is designated throughout as 11. The box or cabinet is divided into upper storage compartment A (shown in plan view in Figure 3) and the lower or mechanical compartments B and and C are insulated and isolated from compartment A except for communicating ducts 12 and 13 for supplying cool air from compartment B to compartment A, and returning it to compartment B during the refrigeration cycle. Compartments B and C are insulated and isolated from each other except during defrosting periods. At such times compartments A and B are isolated from each other by any suitable means. Any suitable conventional means for defrosting may be used.

With defrosting only once each day, the defrost cycle occurs during the night period. An insulated night cover is placed over the food compartment preventing any change of dangerous increase in food product temperature during the relatively short period during which the cooling coil is being defrosted.

The water accumulating in drip pan 16 flows through line 17 to evaporator pan 18, in which are sections of porous stones 19. These absorb the water and provide surface for its evaporation by the air from the compressor fan.

Above the insulation 20 and 21 is a plate 22, separating compartment A from B and C. Above this is the food compartment floor 23, which is supported by a plurality of short sections or clips of channel iron 24. The end walls 25 and back wall 26 are of sheet metal and are spaced inwardly from the box walls 11. Front wall 27, which is of glass Thermopane, is spaced inwardly from the glass Thermopane front wall 28 of the box. This provides visual inspection of the contents of the box, not only from the top as is usual, but from the front as well. The spaces between the exterior and interior walls, and between the floor 23 and plate 22, form a duct for return of cold air to cooling coil 15 by way of duct 13, as will be more fully explained hereinafter.

The back wall 26 is spaced inwardly from wall 11, forming a longitudinal duct 29 communicating directly with the manifold 30, into which duct 12 from the cooling coil 15 opens.

In duct 29 are a series of thin sheet metal dividers 31, generally spaced about 2.5 inches apart. Between these and in the upper wall of duct 30, are slots or orifices 32, through which the incoming air must pass into duct 29. The purpose of these slots 32 is to distribute the air equally along the back of the box. The dividers serve to provide an equal, parallel, vertical flow of air, so that the air supply to the storage compartment is always uniform throughout the entire length. These are important and vital features of the construction. Over the top of wall 26 and extending somewhat into duct 29 for its full length, is a splitter 33, by which part of the air supply is directed downwardly into the food compartment. The curved surface of splitter 33 creates a turbulence in the air stream, so that it spreads down and out across the food packages toward the front wall 27. Over the top of duct 29, above splitter 33, is member 34, having a curved, forwardly extending undersurface 35. The air not diverted by splitter 33 is rendered turbulent and is directed downwardly and forwardly by surface 35. The two air currents mingle, and the resulting flow into and across the box is uniform, as indicated by the direction arrows. The air flows into the duct at the ends and front of the box and is returned to the cooling coil to be further refrigerated. The walls of the box, 11 and 28, extend about 3 to 4 inches higher than walls 25 and 27. When observing the unit in operation, the blanket of air is easily seen, because of the light frost cloud that forms where the warm air of the room meets the cold, flowing air in the box. The air flowing across the top of the box not only cools the food packages, but insulates them from the warm air. Temperatures of —10° to —20° F. can be maintained with no difficulty at the top of walls 25 and 27, even on the hottest days. There is no spill-over of cold air from the box. The glass panels 27 and 28, and the walls 25, as well as the interior of the box, remain free of frost. At night the box is generally covered, in order to conserve power. When the cover is removed, there may be a faint frost fog formed on the glass, but this dissipates within a short time, as the volume of air increases to compensate for the increased refrigeration needs.

It will be observed that the food compartment is not only blanketed by, but surrounded by, cold air on all sides.

The cooling unit 15 is best illustrated in Figures 4 and 5. It comprises a fan 36, driven by motor 37. The cooler itself is of unique construction and extremely efficient. A continuous pipe coil, generally of copper tubing, is housed in 39. Headers 40 join the pipe lengths and extend from the housing to within a short distance of the inner walls of compartment B. Only a few of these are illustrated, for convenience, although in a commercial unit there may be several hundred of them. They constitute a prime surface over which the air returning from the food compartment must pass to reach fan 36. It is here that the major part of the frost deposits. The purpose of these exposed return bends is to accumulate the water vapor from the air and thus dehumidify it. The cooling job is done inside the unit. The coil housing 39 is divided into three compartments D, E and F, by partitions 41 and 42, with pipes 38 extending therethrough. The pipes are equipped with fins 43 running parallel with the air flow, the tubes and fins forming a bundle. The fins are most widely spaced in compartment D, usually three to the inch. In compartment E they are more closely spaced, about four to the inch, and in compartment F they are still closer together, about five to the inch. This is an important feature, since it accounts for the long periods of operation between defrosting, with cooling efficiency and air capacity being maintained at a high level. It is in effect, a four pass system; a preliminary predefrosting on headers 40, cooling and further defrosting in compartment D where the fins are widely spaced to prevent cutting down air capacity as the frost accumulates. A similar effect is obtained in compartment E, where less frost accumulates and more cooling occurs because of the increased surface. Finally, the air is supercooled in compartment F where the greatest cooling surface exists, and it then passes through duct 12 to the food compartment as previously described. Compartment D is joined to compartment E by duct 44, in which is splitter 45, to assure good distribution of air over the coils. Compartment E is joined to compartment F by duct 46, containing splitter 47.

This unique cooling unit makes it possible to defrost only once a day. Other units must be defrosted at intervals of 3 to 8 hours. Because of their construction and frequent defrosting required, some of the food unavoidably partially thaws. The present cooling unit, and the unique box construction described above, eliminate thawing, and make possible defrosting at night when the stores (in which these cabinets are used) are closed, and at times when the food compartment can be covered so that the warm air never reaches the food packages. Moreover, the unique construction of the box eliminates all partitions therein. In many refrigerated display boxes, the partitions contain refrigeration coils which accumulate frost, and which warm up during defrosting periods, with consequent partial thawing of food, especially that in contact with them. The present invention eliminates all this, as well as the attending disadvantages.

The novel evaporation system eliminates need for drain connections.

The top surface 48 of element 34 can be used to display accessory items. The back of the unit can be extended upwardly to provide additional shelf space for such items, and can be equipped with the usual reflecting mirrors and advertising displays.

The actual construction of the device is within the skill of the art. Metal joints may be welded. The Thermopanes are items of commerce, and may be sealed in rubber or plastic into the unit. The compressor is conventional. Bumpers 49 may run around the cabinet on three sides to prevent damage to the finish by grocery carts now commonly used in stores. Dehumidification of the air in the cooling unit, as well as the uniform air blanket over the package compartment, not only tends to prevent deposition of frost therein, but to evaporate any that may form.

Insulation materials are important, but many efficient insulators are available. The elements 19 may be of porous rock, sections of fire brick or tile, and the like. The front and back of compartment C are equipped with louvers to permit circulation of air around the compressor and motor to keep them cool.

Doors for ready access to the mechanical equipment and coils are provided.

An example of some of the operating conditions may be helpful for understanding the invention. A unit was constructed 84.5 inches long, 32.5 inches wide and 69½ inches high (at the back), these being exterior dimensions. The interior length was 75.5 inches, width 23.5 inches, and the height of the food compartment was 19.75 inches. The air to manifold 30 had a velocity of 400–500 feet, through orifices 32, 1180–1220 feet, through duct 29, 300 feet, from splitter 33, 150 feet, and across the package area, 100 feet, these being linear velocities per hour. Temperatures of refrigerant supplied were —30° F., and at the exit 22° F. The air temperature at duct 12 was —27° F. A compressor operating from a one horse power motor was used. Capacities and operating conditions can be varied in units of varying sizes, as will be obvious to one skilled in the art. It is apparent that more than three compartments can be used in the cooling unit.

Element 50 is a ball float which seals tube 17 after defrosting is complete and the water has drained from pan 16. The food storage box is removable for periodic cleaning, merely resting on the spacers 24, and at the rear, on manifold 30.

I claim as my invention:

1. A refrigeration system comprising an open top storage compartment and an outer cabinet, the storage compartment being spaced inwardly from the cabinet, a compressor unit, an air cooling unit, housings for each, a manifold communicating with the cooling unit and extending along one side of the cabinet, a vertical duct, a plurality of orifices in the manifold, communicating with the duct, vertical dividers in the duct between said orifices, a splitter to direct a portion of the air from the vertical duct downwardly and outwardly through and across the storage compartment, means spaced above the splitter to direct the remaining air downwardly and outwardly through and across the storage compartment, the walls of the cabinet extending above the walls of the storage compartment and spaced outwardly therefrom, means spaced from the bottom of and separating the storage compartment from said housings, thereby forming an annular space between the walls of the cabinet, said last named means, and the walls and bottom of said storage compartment, a duct from said last named means communicating between the annular space and the cooling unit housing, means to draw air through said annular space, the last named duct and the housing of the cooling unit and to force it through the cooling unit and thence to the manifold.

2. A refrigeration system comprising a normally open-top storage compartment and an outer cabinet, the storage compartment being spaced inwardly from the cabinet, a compressor unit, a blast cooling unit, housings for each, a manifold communicating with the cooling unit and extending horizontally across the entire back of the cabinet, a vertical duct, a plurality of orifices distributed across the entire length of the manifold communicating with the duct, a plurality of vertical dividers spaced equidistant in the duct between said orifices to provide equal, parallel, vertical flow of air, means to direct the air from the vertical duct outwardly and downwardly through and across the storage compartment, the walls of the cabinet extending above the walls of the storage compartment and spaced outwardly therefrom thereby forming an annular space, the floor of the storage compartment being spaced from the top wall of said housings, constituting a communicating duct between the annular space and the blast cooling housing, means for drawing air through said space and said duct into said cooling unit housing and to force it through the cooling unit and thence to the manifold.

3. In a display refrigeration system comprising a blast cooling unit and means for circulating air over the unit, then to a food storage compartment, and returning it to the cooling unit, the improvement comprising a horizontal manifold positioned across the entire length of the rear of the storage compartment and having a plurality of orifices at regularly spaced intervals therealong, a vertical duct with which the orifices communicate, a plurality of vertical dividers spaced equidistant in the duct placed between adjacent orifices to provide equal, parallel, vertical flow of air, a splitter at the top of the duct to divide the air stream and direct a portion of it downwardly and forwardly through and across the storage compartment, and a deflector above and extending forwardly of the splitter to direct the remaining portion of the air stream downwardly and forwardly to commingle with the first named portion of the air stream.

ROBERT H. BISHOP.

References Cited in the file of this patent

UNITED STATES PATENTS

| Number | Name | Date |
|---|---|---|
| 1,524,520 | Junkers | Jan. 27, 1925 |
| 2,047,249 | Ballard | July 14, 1936 |
| 2,255,616 | Heasley | Sept. 9, 1941 |
| 2,466,286 | Stultz | Apr. 5, 1949 |
| 2,511,375 | Raskin | June 13, 1950 |
| 2,626,508 | Bently | Jan. 27, 1953 |